United States Patent
Stewart (10) Patent No.: US 9,433,144 B2
(45) Date of Patent: Sep. 6, 2016

(54) ORIFICE SELECTOR MODULE FOR LIQUID FERTILIZER DISTRIBUTION SYSTEMS

(71) Applicant: CDS-John Blue Company, Huntsville, AL (US)

(72) Inventor: Jason T. Stewart, Harvest, AL (US)

(73) Assignee: CDS-John Blue Company, Huntsville, AL (US)

(*) Notice: Subject to any disclaimer, the term of this patent is extended or adjusted under 35 U.S.C. 154(b) by 215 days.

(21) Appl. No.: 14/202,934

(22) Filed: Mar. 10, 2014

(65) Prior Publication Data

US 2014/0252140 A1  Sep. 11, 2014

Related U.S. Application Data

(60) Provisional application No. 61/775,241, filed on Mar. 8, 2013.

(51) Int. Cl.
| | | |
|---|---|---|
| *A01C 23/04* | (2006.01) | |
| *F16K 3/08* | (2006.01) | |
| *A01C 23/00* | (2006.01) | |

(52) U.S. Cl.
CPC .............. *A01C 23/04* (2013.01); *A01C 23/007* (2013.01); *F16K 3/08* (2013.01); *Y10T 137/86863* (2015.04)

(58) Field of Classification Search
CPC ................... F16K 3/08; A01C 23/00–23/047; Y10T 137/86863; B05B 1/20–1/207
USPC .................. 239/146–176, 722–754; 251/206
See application file for complete search history.

(56) References Cited

U.S. PATENT DOCUMENTS

| | | | |
|---|---|---|---|
| 2,510,356 A | * | 6/1950 | Werts ..................... E21B 34/02 137/454.2 |
| 3,527,928 A | | 9/1970 | Ryder et al. |
| 3,537,091 A | | 10/1970 | Schenkenberg |
| 3,723,989 A | | 3/1973 | Fathauer et al. |
| 4,009,799 A | | 3/1977 | Fathauer |
| 4,100,538 A | | 7/1978 | Knepler |
| 4,116,138 A | * | 9/1978 | McFarland .......... A01C 23/007 111/120 |
| 4,149,163 A | | 4/1979 | Fathauer |
| 4,159,064 A | | 6/1979 | Hood |
| 4,253,766 A | | 3/1981 | Funk |
| 4,268,825 A | | 5/1981 | Kaplan |

(Continued)

OTHER PUBLICATIONS

"CDS-John Blue Next Generation Electronic Liquid Blockage Moniter System", News Flow, quarterly newsletter of CDS-John Blue Company, vol. 13, Issue 47, pp. 1-2, Spring 2013.

(Continued)

*Primary Examiner* — Arthur O Hall
*Assistant Examiner* — Juan C Barrera
(74) *Attorney, Agent, or Firm* — Law Office of Mark Brown, LLC; Mark E. Brown; Christopher M. DeBacker (57) ABSTRACT

An orifice selector module for use with flow gauges in a sprayer environment. The orifice selector module is retrofit into existing or new flow gauge assemblies and is placed in line between the spray nozzles and the flow gauges. The orifice selector module includes a rotatable cap which rotates a rotor which in turn rotates an orifice plate which features numerous orifices of different sizes. These orifices can be switched on the fly manually by the vehicle operator to increase or decrease flow through a particular hose from a particular flow gauge.

2 Claims, 7 Drawing Sheets

(56) References Cited

U.S. PATENT DOCUMENTS

| | | | |
|---|---|---|---|
| 4,366,947 A * | 1/1983 | Voege | A61M 16/20 138/45 |
| 4,369,895 A | 1/1983 | McCarty et al. | |
| 4,401,909 A | 8/1983 | Gorsek | |
| 4,555,624 A | 11/1985 | Steffen | |
| 4,782,282 A | 11/1988 | Bachman | |
| 4,803,626 A | 2/1989 | Bachman et al. | |
| 4,962,892 A * | 10/1990 | Sauer | A01M 7/0035 239/159 |
| 4,986,782 A | 1/1991 | Severtson | |
| 5,170,820 A | 12/1992 | Jones | |
| 5,193,400 A | 3/1993 | Lew | |
| 5,260,875 A | 11/1993 | Tofte et al. | |
| 5,323,721 A | 6/1994 | Tofte et al. | |
| 5,475,614 A | 12/1995 | Tofte et al. | |
| 5,485,983 A * | 1/1996 | Voege | F16K 3/085 251/206 |
| 5,520,333 A | 5/1996 | Tofte | |
| 5,574,657 A | 11/1996 | Tofte et al. | |
| 5,635,911 A | 6/1997 | Landers et al. | |
| 5,884,205 A | 3/1999 | Elmore et al. | |
| 5,897,600 A | 4/1999 | Elmore et al. | |
| 5,967,066 A | 10/1999 | Giles et al. | |
| 6,269,757 B1 | 8/2001 | Kiest | |
| 6,850,849 B1 | 2/2005 | Roys | |
| 7,028,984 B2 * | 4/2006 | Wang | F16K 3/08 251/206 |
| 7,710,282 B1 | 5/2010 | Young | |
| 7,720,574 B1 | 5/2010 | Roys | |
| 7,739,921 B1 | 6/2010 | Babcock | |
| 7,782,461 B1 | 8/2010 | Massey et al. | |
| 7,970,558 B1 | 6/2011 | Roys | |
| 2005/0211802 A1 * | 9/2005 | Newton | F16L 41/03 239/548 |
| 2006/0237562 A1 * | 10/2006 | Hedegard | A01C 23/007 239/548 |
| 2012/0152376 A1 | 6/2012 | He et al. | |
| 2012/0216732 A1 | 8/2012 | Ballard et al. | |
| 2012/0228395 A1 * | 9/2012 | Needham | A01G 25/16 239/11 |

OTHER PUBLICATIONS

"CDS-John Blue VisaGage II Flow Monitor", From the CDS-John Blue catalogue at http://www.cds-johnblue.com/cds-johnblue-pump-catalog.pdf, Aug. 2012.

"International Search Report and Written Opinion", PCT/US2013/066958, Mar. 5, 2014.

"Planter & Grain Drill Fertilizer Application Systems: GX7", Schaffert Manufacturing & Sales; Obtained at the 2012 National Farm Machinery Show in Louisville, KY, Feb. 2012.

* cited by examiner

ORIFICE SELECTOR MODULE FOR LIQUID FERTILIZER DISTRIBUTION SYSTEMS

CROSS-REFERENCE TO RELATED APPLICATION

This application claims priority in U.S. Provisional Patent Application No. 61/775,241, filed Mar. 8, 2013, which is incorporated herein by reference.

BACKGROUND OF THE INVENTION

1. Field of the Invention

The present invention relates generally to an orifice selector module, and more specifically to an orifice selector module for use in a liquid fertilizer distribution system.

2. Description of the Related Art

Orifice selectors for liquid fertilizer distribution systems allow for a single distribution system to provide liquid fertilizer at different flow rates while maintaining a desired pressure range, as the need arises. They are typically employed in planters, applicators, and sprayers used in the agricultural industry.

A typical fertilizer distribution system consists of: a pump, a flow divider mechanism, a number of gauges for monitoring the supply-line flow-rate, and a number of check valves, tubing, and hoses. This allows the system to distribute to a number of fluid outlets. Two main types of flow dividing systems are used today. The first is a lower pressure system using a needle-type flow divider, such as the flow divider disclosed and claimed in U.S. Pat. No. 6,311,716, and sold by CDS-John Blue Company of Huntsville, Ala. The second is a higher pressure system using orifice plates, which may be located just after the manifold which divides the flow, or located at the row unit. The second system requires the user to alter the orifice size when changing pump output rates.

In traditional high pressure systems using orifice plates, the orifice must be manually changed by an operator. Examples of this include the "Quick TeeJet® Multiple Nozzle" provided by TeeJet Technologies, a subsidiary of Spraying Systems Co. of Wheaton, Ill. Other similar consumer products have rotatable selectors to change the fluid flow or the shape of the flow output. The problem with all of these systems is that the user must manually adjust each orifice separately at the fluid outlets, which are spaced along the length of the implement. On a system with eight or more diverted flow paths, that can become time consuming.

What is needed is a system for quickly selecting and adjusting the orifice for each and every divided flow path at the same time in one location.

Heretofore there has not been available an orifice selector module for use with a liquid fertilizer distribution system with the advantages and features of the present invention.

BRIEF SUMMARY OF THE INVENTION

The present invention generally provides a module that will install in the top of flow rate gauge columns and allow the user to quickly select between one of multiple different orifice sizes. The multiple orifice sizes are located in a single plate/disc, which itself is interchangeable. However, the preferred embodiment includes a single plate with four common orifice sizes and would typically not need changing or replacing over the life of the module. This system would be used on (but not limited to): planters, applicators, and sprayers.

The preferred embodiment would allow switching of the orifice in each of several flow rate gauge columns either quickly or, in an alternative embodiment, simultaneously. The gauges and orifice selectors are located very closely together so that they can quickly be changed individually, if desired. This saves time and ensures that there is not human error resulting in one or more orifices being incorrectly switched or forgotten.

Due to the construction of a preferred embodiment of the present invention, an accidental overpressure condition caused by a user's mistake can be partially dissipated. A rotatable plunger, which seals off the other unused orifice holes, is spring loaded, and if the system pressure exceeds the maximum rated pressure, the spring will lift off of the plate. This causes the fluid to lift the plunger and escape around the plate and plunger, rather than through the other orifice holes.

BRIEF DESCRIPTION OF THE DRAWINGS

The drawings constitute a part of this specification and include exemplary embodiments of the present invention illustrating various objects and features thereof

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Orifice Module 2 System

The present invention has a number of advantages over presently available orifice module systems. The user will not have to keep track of extraneous orifices that are not in use. Further, the user will not have to interchange the orifice on each row unit; all orifices can be adjusted in quick succession or, in an alternative embodiment, simultaneously, and do not require manual manipulation. Thus, there is no need to disassemble even a portion of the system in order to change the orifice size. Ideally, the orifice disk will be made of stainless steel or a suitably rugged material, and not plastic.

A rotatable plunger used to seal off the other unused orifice holes is spring loaded, preventing an accidental overpressure condition caused by a user's mistake. The plunger can be partially lifted when the spring lifts off of the plate, which allows the fluid to lift the plunger and escape around the plate and plunger, rather than through the other orifice holes.

Figure 1:
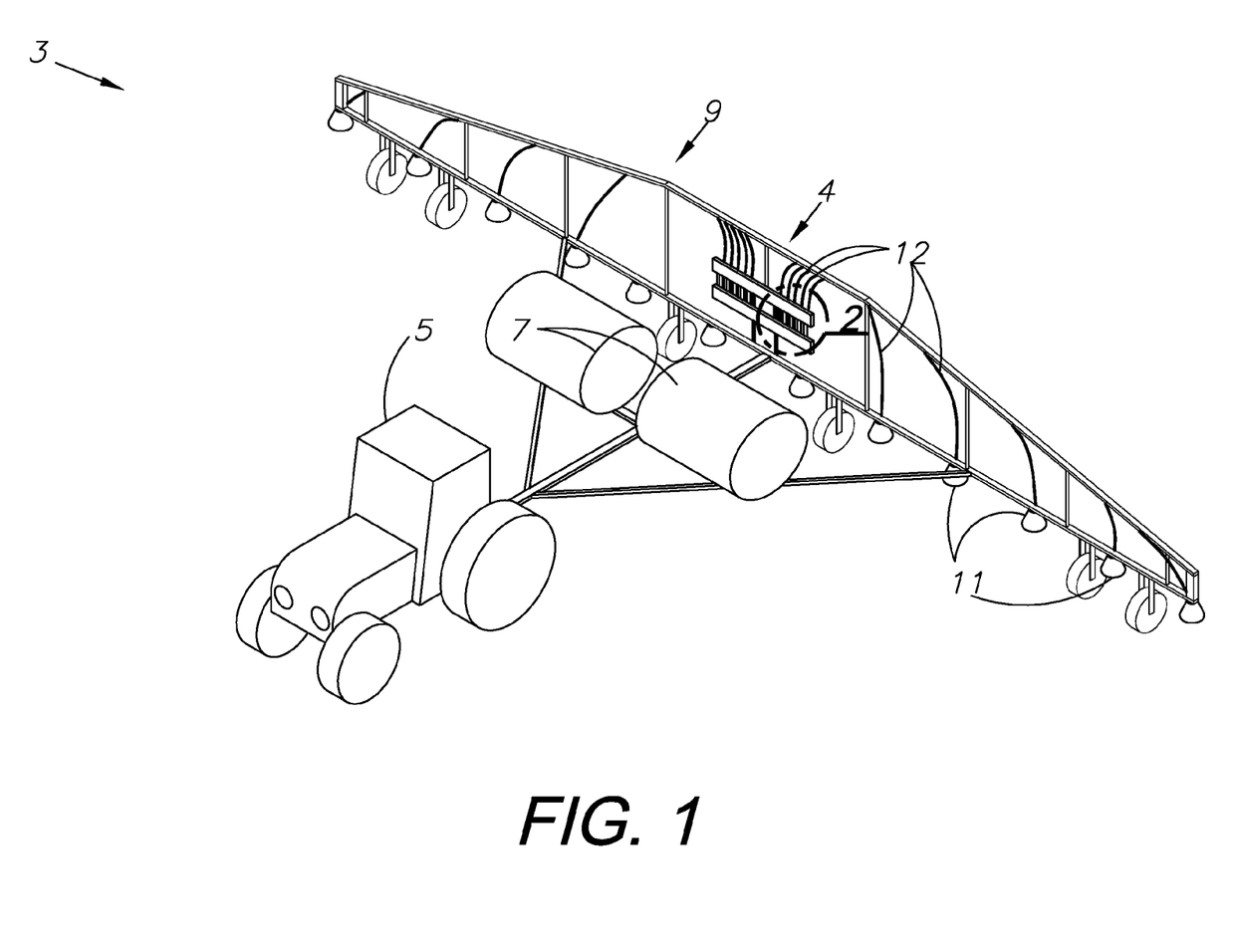
FIG. 1 is an isometric perspective diagram of an embodiment of the present invention employed in a typical environment.
Figure 2:
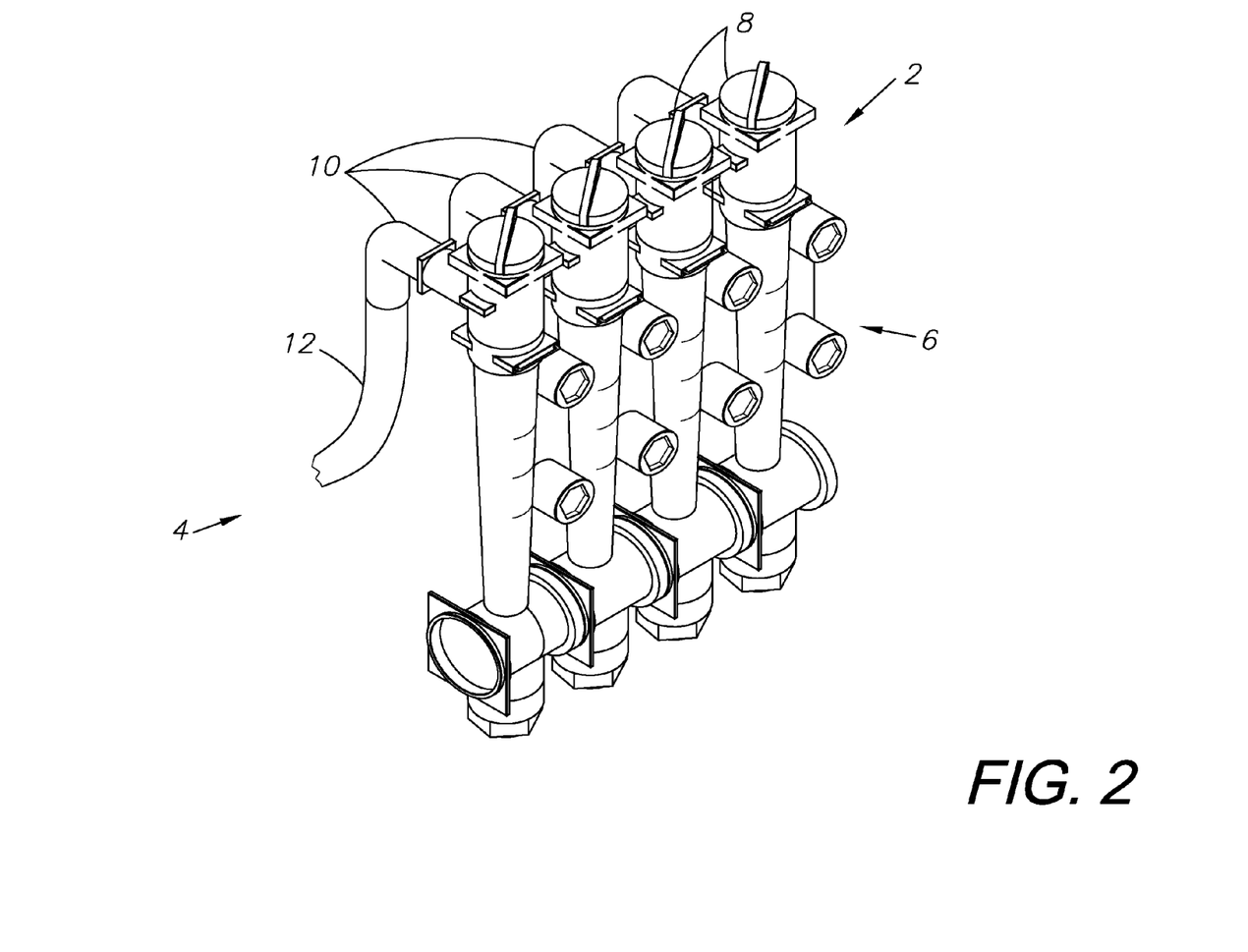
FIG. 2 is a detailed isometric perspective diagram taken about the circle of FIG. 1, demonstrating how the embodiment would interface with a typical flow gauge environment.

FIG. 1 demonstrates an orifice module 2 being used in a typical flow-gauge system 4 as part of a fluid distribution system 3. The fluid distribution system includes a tractor 5 which pulls a sprayer assembly 9 including tanks of liquid 7 to be dispensed via a plurality of spray nozzles 11. Each spray nozzle is connected to a flow-gauge via an independent hose 12. Each hose connects to an orifice module 2, as shown in FIG. 2, using an elbow 10 or similar connection. Each orifice module 2 is connected to a separate flow gauge 6, and allows for customized selection of flow rate through each hose 12 by selecting the appropriate orifice 44 using the orifice module 2.

Figure 3:
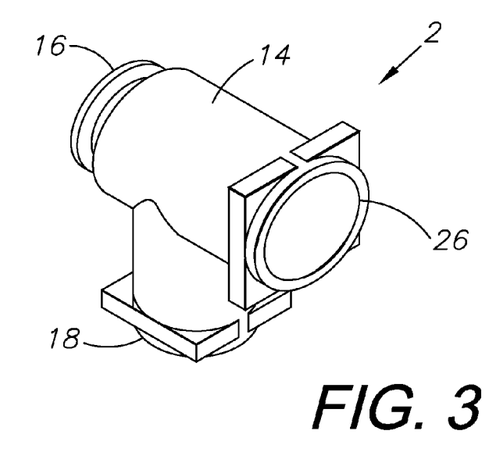
FIG. 3 is an isometric perspective view of an embodiment of the present invention.

FIG. 3 shows the orifice module 2 in more detail. The orifice module features three "ends": a cap receiver end 26 which receives the rotatable cap 8; an insert end 16 which connects the module 2 to the flow gauge 6; and a receiver end 18 which receives the hose 12 or elbow 10 as shown in FIG. 2.

Figure 4:
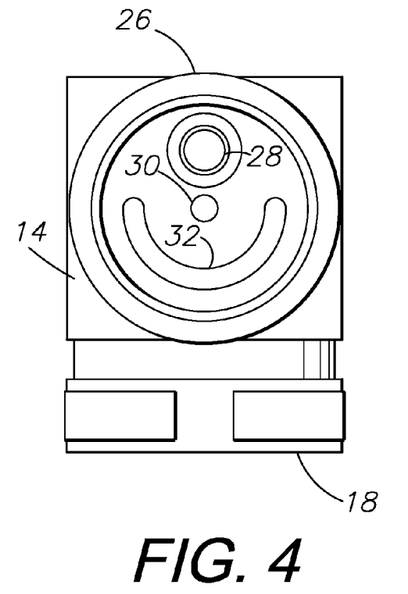
FIG. 4 is a top-plan view of an embodiment of the present invention as it would be situated in a typical environment as shown in FIGS. 1 and 2.
Figure 5:
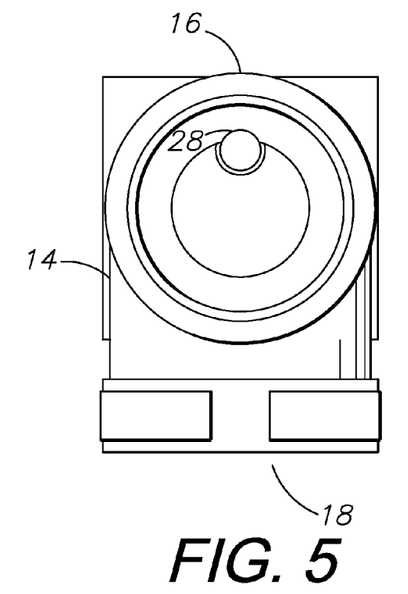
FIG. 5 is a bottom-plan view thereof.

FIGS. 4 and 5 are views taken through the cap end 26 and insert end 16 respectively, joined through an opening in the module body 14. An orifice 28 passes through to the insert end which allows the fluid being pumped through the module 2 to enter the hose 12. A pivot point 30 and rotation slot 32 allows for the various selectable orifices 44 to be switched, depending on the liquid application desired.

Figure 6:
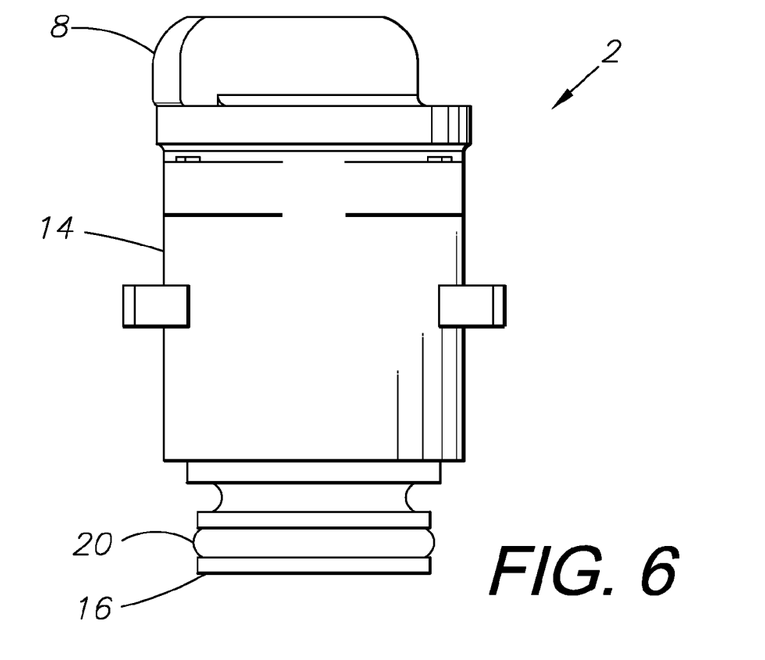
FIG. 6 is a side elevational view thereof.
Figure 7:
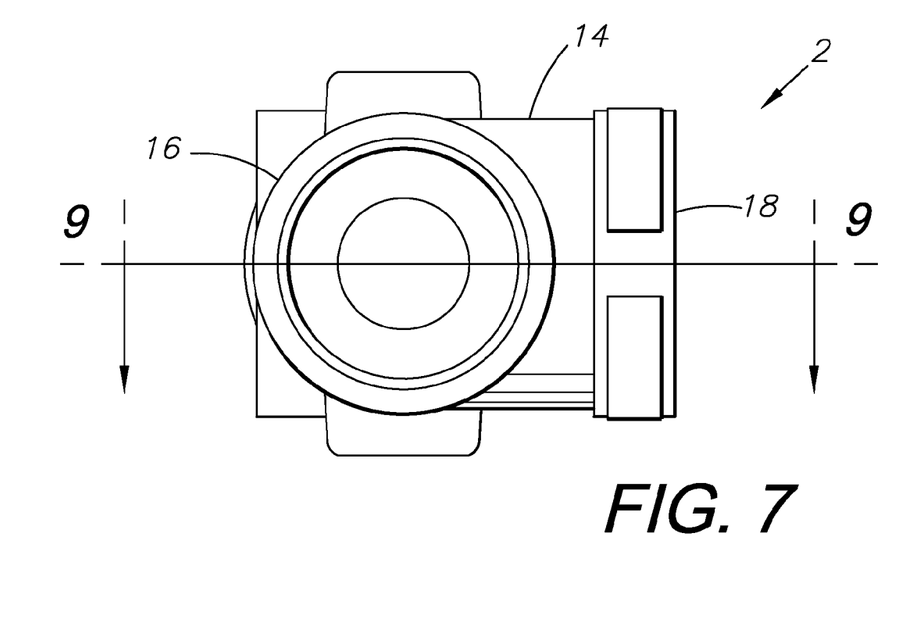
FIG. 7 is an alternative side elevational view thereof.
Figure 8:
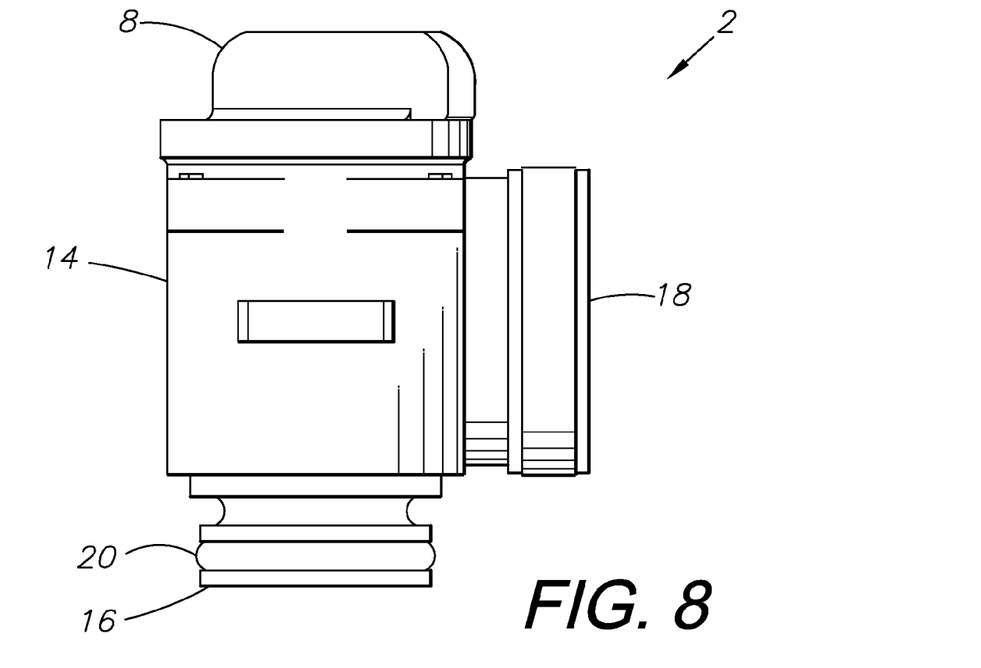
FIG. 8 is an alternative side elevational view thereof.

FIG. 6 shows the module 2 assembled, including the cap 8 inserted into the cap end 26 and an o-ring 20 placed about the insert end 16. Various o-rings 20 insure that liquid does not seep out between the connection joining the hose 12 to the module 2 to the gauge 6. The cap 8 functions as a rotatable knob which allows the user to manually select the selectable orifice 44 desired for the liquid application. FIGS. 7-8 provide additional views of the assembled orifice module 2.

Figure 9:
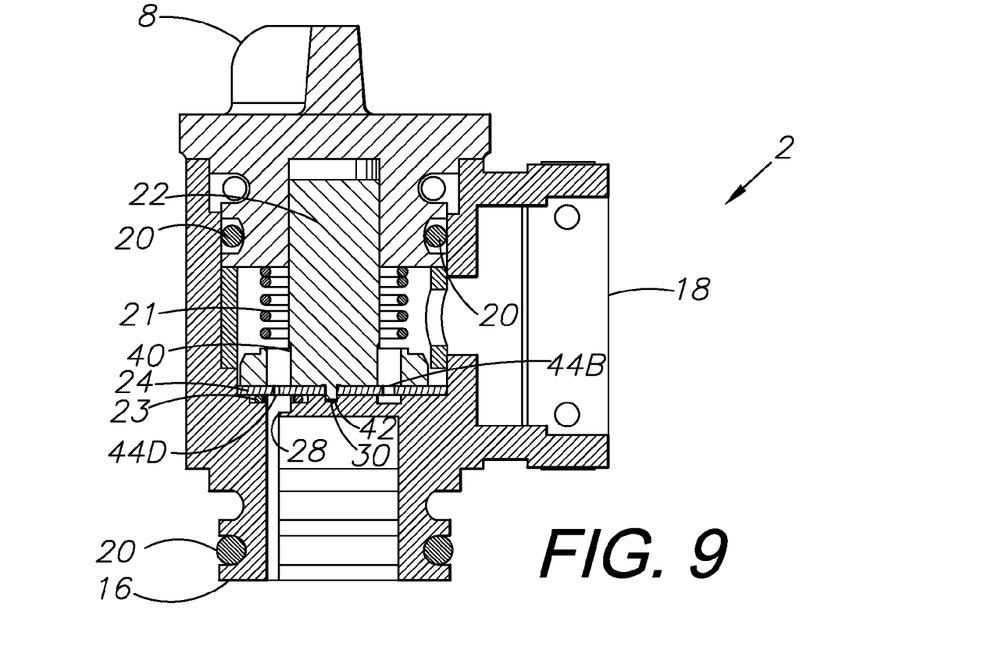
FIG. 9 is a sectional view thereof as taken about the line in FIG. 7.

FIG. 9 is a sectional view of an orifice module 2 as taken about the line in FIG. 7. This view shows the internal workings of the module. The cap 8 includes a receiver 38 for receiving a rotor 22. The rotor 22 has an elongated stem 34 which is inserted into the cap. In a preferred embodiment, the rotor and cap can only engage with one another when aligned in the proper way—the receiver 38 is shaped such that it can only receive the elongated stem 34 of the rotor 22 when the two elements are properly oriented. An orifice o-ring 23 surrounds the orifice 28 passing through the body of the orifice module 2, which prevents fluid from leaking between the orifice plate 24 and the module body.

A spring 21 is placed about the elongated stem 34 of the rotor 22. The cap 8 presses down on that spring when the assembly is inserted into the body 4 of the module 2. An orifice plate 24 is received by the base of the rotor 22. In a preferred embodiment, the rotor 22 includes a number of tabs 36 around the circumference its base and a pivot stem 42 located in the center of the rotor base. The rotor tabs engage respective slots 46 located in around the circumference of the orifice plate 24 and the pivot stem 42 passes through an opening 48 located in the center of the orifice plate 24 and the pivot stem 42 further interfaces with the pivot point 30 of the module body 14.

Figure 10:
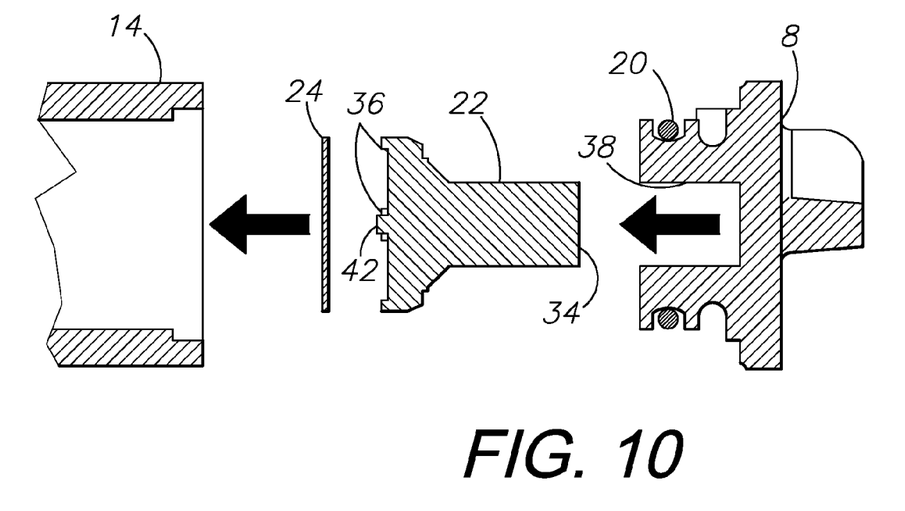
FIG. 10 is a sectional view of various components of an embodiment of the present invention, diagramming the way the components interact.
Figure 11:
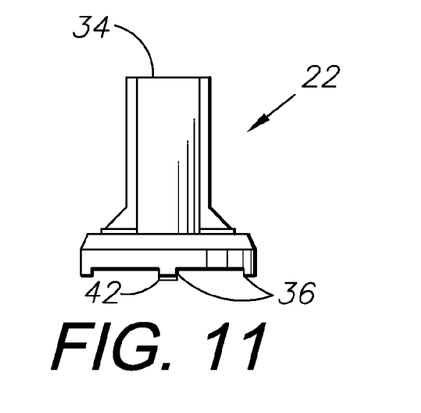
FIG. 11 is a side elevational view of a rotor component of an embodiment of the present invention.
Figure 12:
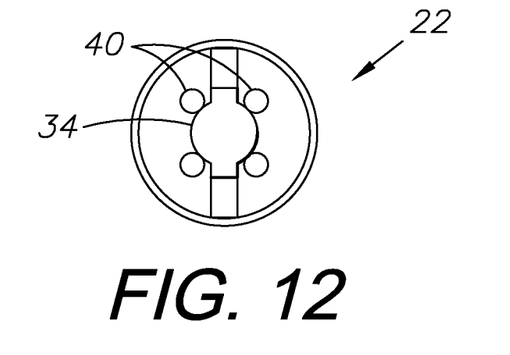
FIG. 12 is a top plan view thereof.
Figure 13:
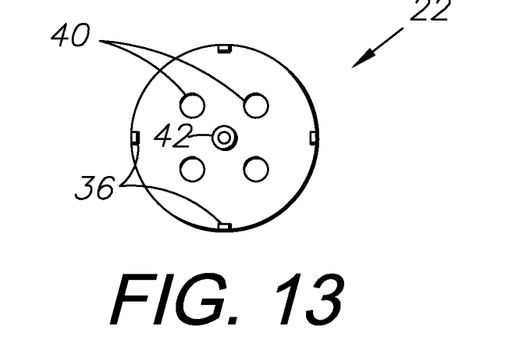
FIG. 13 is a bottom plan view thereof.

FIG. 10 shows the interface between these elements in more detail, while FIGS. 11-14 show more detail of the rotor 22 and the orifice plate 24.

A number of holes 40 pass through the body of the rotor 22. These holes align with the selectable orifices 44 passing through the orifice plate. Each of these selectable orifices 44 are of different sizes, having the first orifice 44A be larger than the second orifice 44B, which in turn is larger than the third orifice 44C, and which in turn is larger than the fourth orifice 44D. Alternatively, the plate could be turned to a blank space between two selectable orifices to block flow through that module 2 completely.

Figure 14:
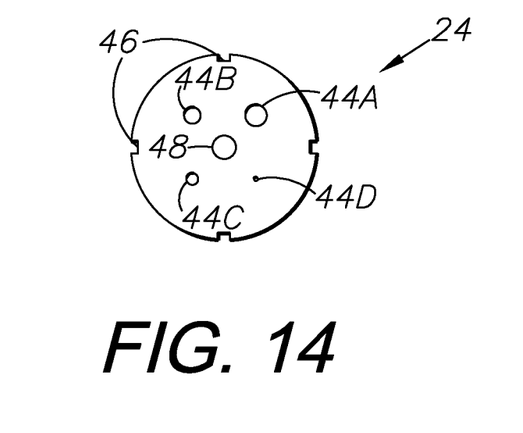
FIG. 14 is a top plan view of an adjustable orifice plate component of an embodiment of the present invention.

In a first preferred embodiment, the first orifice 44A has a 0.098" diameter, the second orifice 44B has a 0.067" diameter, the third orifice 44C has a 0.047" diameter, and the fourth orifice 44D has a 0.027" diameter.

In a second preferred embodiment, the first orifice 44A has a 0.150" diameter, the second orifice 44B has a 0.140" diameter, the third orifice 44C has a 0.125" diameter, and the fourth orifice 44D has a 0.107" diameter.

The various components of the preferred embodiment of the present invention are polypropylene, 316 SS, and Viton. The maximum pressure of each module 2 matches the maximum pressure of the flow gauges 6, so there is no degradation in system quality.

This invention has many advantages over existing systems. The multiple selectable orifices 44 allow for orifices to be changed without disassembling the unit, risking spilling of liquid from the system. Further, individual orifice plates do not need to be kept track of as the one disk is inserted into the system at all times. This also leads to a quick adjustment to the rows of hoses 12 feeding the sprayer nozzles 11, as each module can be quickly manually changed by rotating the cap 8 without needing to replace the orifice in each assembly separately. These modules 2 can be retrofit into existing flow gauge systems, such as the Visagage of the CDS-John Blue Company of Huntsville, Ala.

An alternative embodiment system employs an electronic user interface which is connected to the selector module and electrically controls the switching between orifices. This allows the switching of the orifices simultaneously within a number of flow gauges.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile agricultural sprayer including: a fluid input including a fluid source connected to multiple orifice selector modules having inlet ends; a plurality of flow gauges connected to said fluid source and arranged in a flow gauge assembly; said multiple orifice selector modules each including: a module body; a cap receiver end with a first opening; said inlet end with a second opening; a discharge end with a third opening; and a distribution orifice communicating with said third opening; each said flow gauge being connected to the respective orifice selector module inlet end; multiple spray nozzles each connected to the respective selector module discharge end and configured for receiving and discharging fluid; each said orifice selector module further including: a selector cap and a rotor rotatably received in said cap receiver end first opening; each said rotor including: a rotor base; a pivot stem extending from said base; and an elongated rotor stem extending from said base and engaging and rotating with the respective selector cap; each said orifice selector module further including: an orifice plate between the respective rotor base and the respective module body, said orifice plate having multiple orifices; and a spring receiving the respective rotor stem, said spring engaging the respective selector cap and the respective rotor base, said spring biasing the respective rotor into the respective first opening and maintaining said orifice plate in engagement with said module body under normal fluid operating pressures, said spring being configured for releasing said orifice plate from the respective module body under excessive fluid pressure; each said orifice plate further comprising a central pivot hole configured to receive said pivot stem and configured to rotate along with said rotor and said selector cap whereby the respective orifice plate orifices individually align with said distribution orifice; each said selector cap including a first O-ring interface; each said orifice selector module further including an O-ring located within said selector cap first O-ring interface, thereby creating a water-tight seal between the respective orifice selector module first opening and the respective rotatable cap; each said orifice selector module further including a first O-ring located within said first O-ring interface, thereby creating a water-tight seal between said orifice selector module first opening and said rotatable cap; each said orifice selector module further including a second O-ring located between said orifice plate and an internal face of said orifice selector module body surrounding said distribution orifice; and wherein said second O-ring creates a water-tight seal between said orifice plate and said orifice selector module body.

2. The sprayer according to claim 1 wherein each said rotor base includes a plurality of tabs and each said orifice plate includes a plurality of slots receiving respective tabs.

* * * * *